B. T. GENTHNER.
Seed-Sower.
No. 222,348. Patented Dec. 9, 1879.
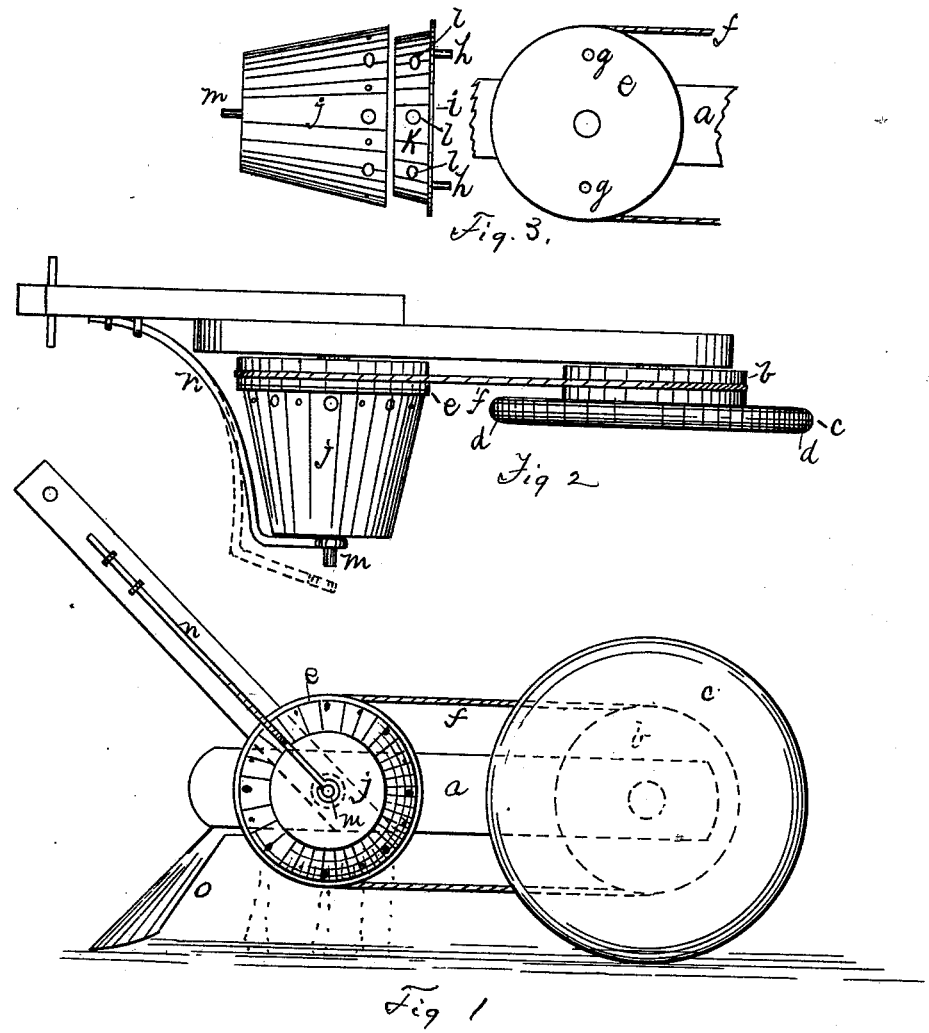

UNITED STATES PATENT OFFICE.

BENJAMIN T. GENTHNER, OF FOXCROFT, MAINE.

IMPROVEMENT IN SEED-SOWERS.

Specification forming part of Letters Patent No. 222,348, dated December 9, 1879; application filed December 14, 1878.

*To all whom it may concern:*

Be it known that I, BENJAMIN T. GENTHNER, of Foxcroft, in the county of Piscataquis and State of Maine, have invented certain new and useful Improvements in Seed-Sowers; and I do hereby declare that the following is a full, clear, and exact description of the invention, that will enable others skilled in the art to which it appertains to make and use the same, reference being had to the accompanying drawings, forming a part of this specification, in which—

Figure 1 shows a side elevation of my invention; Fig. 2, a plan; Fig. 3, details of construction.

Same letters show like parts.

My invention relates to certain improvements in seed-sowers; and it consists of a new arrangement of parts and of devices rendering the machine more convenient for use. It will be readily understood by reference to the accompanying drawings.

At $a$ is shown a suitable frame, with the usual handle. At $b$ is a pulley attached to said frame and having rigidly secured to its opposite side a wheel, $c$, having a rounded or beveled periphery, $d$. This wheel serves the double purpose of supporting the front end of the frame or beam $a$, and making a groove or furrow in the ground for the reception of the seed. At $e$, attached to the frame or beam $a$, is a second pulley, $e$, connected with pulley $b$ by a band, $f$. The outer face of pulley $e$ is perforated with one or more holes, $g\ g$, into which fit studs $h\ h$, attached to the cover $i$ of the feed-box $j$. The flange K of this cover is perforated with holes $l$ for the exit of the seed, corresponding holes, but of varying sizes, being made are the periphery of the seed-box, into which the flange projects.

The seed-box having been filled and the cover put on, it is held in position on the pulley $e$ by inserting the studs $h\ h$ of the cover into the holes $g\ g$ of the pulley, and springing over a stud, $m$, on the outer end of the seed-box a spring, $n$, provided with an opening to receive said stud, the seed-box, when in position, being capable of revolution on the axis of the pulley $e$ and on said stud. This spring $n$ is secured at its other end to the handle of the machine, and affords a quick and easy method of attaching and detaching the seed-box. This method will be at once apparent from the above description. The revolution of the wheel $c$ communicates motion through the pulleys and band to the seed-box. At $o$ is a follower, which covers the seed when dropped.

What I claim as my invention, and desire to secure by Letters Patent, is—

1. In a seed-sower, the combination, on a frame or beam, $a$, of the supporting and furrow-making wheel $c$, the pulleys $b\ e$ and connecting-band, the removable seed-box $j$, and the retaining-spring $n$, serving as a journal-box for one end of the seed-box, substantially as and for the purposes described.

2. The pulley $e$, having holes $g\ g$ upon its outer face, in combination with studs $h\ h$, attached to the seed-box $j$, and the retaining-spring $n$, substantially as and for the purposes set forth.

BENJAMIN THOMAS GENTHNER.

Witnesses:
B. H. DAVIS,
H. S. DAVIS.